(12) United States Patent
Hirano et al.

(10) Patent No.: US 6,254,959 B1
(45) Date of Patent: Jul. 3, 2001

(54) POSITION-RETAINING MATERIAL AND METHOD OF MANUFACTURING POSITION-RETAINING DEVICE UTILIZING POSITION-RETAINING MATERIAL

(75) Inventors: Hiroyuki Hirano, Funabashi; Naomitsu Takekawa, Tokyo, both of (JP)

(73) Assignee: Alcare Co., Ltd. (JP)

( * ) Notice: Subject to any disclaimer, the term of this patent is extended or adjusted under 35 U.S.C. 154(b) by 0 days.

(21) Appl. No.: 09/366,529

(22) Filed: Aug. 2, 1999

(30) Foreign Application Priority Data

Aug. 3, 1998 (JP) .................................................. 10-231222

(51) Int. Cl.⁷ .............................. A61L 15/10; A61L 15/14
(52) U.S. Cl. .............................. 428/71; 428/76; 428/407; 521/137; 525/127; 525/458; 525/937
(58) Field of Search .............................. 428/71, 76, 407; 525/127, 458, 937; 521/137

(56) References Cited

FOREIGN PATENT DOCUMENTS

| 2310394 | * | 8/1997 | (GB) . |
| 6169978 | | 6/1994 | (JP) . |
| 9224796 | | 9/1997 | (JP) . |

\* cited by examiner

*Primary Examiner*—Patricia A. Short
(74) *Attorney, Agent, or Firm*—Adams & Wilks

(57) ABSTRACT

A position-retaining device comprises a mixture containing a predetermined amount of elastic granules and a water-curable resin having a preselected elasticity after curing sufficient for bonding the elastic granules after curing of the water-curable resin. The mixture forms a mass before curing of the water-curable resin which permits the elastic granules to move one another to shape the mass into a configuration corresponding to the shape of the persons's body or body part when pressure is applied on the mass by the person's body or body part.

33 Claims, 4 Drawing Sheets

POSITION-RETAINING MATERIAL AND METHOD OF MANUFACTURING POSITION-RETAINING DEVICE UTILIZING POSITION-RETAINING MATERIAL

BACKGROUND OF THE INVENTION

1. Field of the Invention

The present invention relates to a position-retaining device for persons whose bodies or body parts are required to be retained in a particular position or attitude and, more particularly, to a position-retaining material which can be made to conform to the configuration of a person's body or body part to provide a position-retaining device which can used to retain the person's body or body part in a required position or attitude with the pressure from the body or body part being distributed uniformly and effectively on the position-retaining device. The present invention also relates to a method of manufacturing the position-retaining device.

2. Background Information

In the field of orthopedic surgery or general surgery, the position of a patient's body or body part is required to be fixed or supported in a constant position for a long period of time during an operation as well as during the recovery period after the operation. There are also situations in which an individual's sitting position must be supported for a long period of time. In order to provide support for or fix the human body or body part in these situations, position-retaining devices such as sand bags, closed-cell foam blocks of various shapes and sizes, restraining belts or a vacuum apparatus have been used.

The use of sand bags, closed-cell foam blocks, restraining belts or the like require a combination of elements having different shapes and sizes which must be uniquely applied for each particular case, and skilled labor is required to apply these devices to patients. Furthermore, since these devices have no elasticity and lack air-permeability, they are uncomfortable for patients. Additionally, the position of the patient's body or body part is likely to be changed when required to be supported in a constant position over a long period of time.

The vacuum apparatus has sphere-like bodies, such as relatively small plastic beads having a diameter of from 1 to 5 mm, which are packed in a hermetically sealed bag. Air is filled in the hermetically sealed bag, and the bag is laid on a bed or an operating table. A patient is then placed on the bag to assume a required position. At this time, the sphere-like bodies are transferred or displaced in the bag in accordance with the shape of the patient's body or body part and the position assumed by the patient. Thereafter, by evacuating the air from the hermetically sealed bag with a vacuum pump to place the interior of the bag in a vacuum state, the sphere-like bodies are prevented from moving and a constant position can be retained.

Although accurate constant support and positioning can be achieved using the foregoing vacuum apparatus, the bag looses its shape when the body or body part of the patient is removed from it. As a result, the foregoing procedure must be repeated in order to support the patient in the required position, which is inconvenient and time consuming. Furthermore, when the vacuum apparatus is used in an operating room, the bag may be accidentally punctured by sharp pointed surgical instruments, such as syringes or surgical knives, thereby destroying the vacuum apparatus and rendering it inoperable. As a result, use of the vacuum apparatus for providing constant support and positioning of a patient's body or body part has not been popular.

Additionally, since the bag used in connection with the vacuum apparatus has no elasticity and lacks air-permeability, it is uncomfortable for patients.

Furthermore, in the field of orthopedic surgery such as, for example, surgery involving the lumber vertebra, cervical vertebra, hip joint, etc., rest is required after the surgery for a relatively long period of time during which patients are required to hold a constant posture. For such a purpose, the required patient's posture has been retained using the sand bag, foam block or vacuum apparatus. However, since these position-retaining devices have poor cushioning and elastic properties, patients experience bedsores over the long period of time during which they are required to maintain the constant posture. Furthermore, since these devices have no air-permeability, patients suffer from sweat retention and are exposed to possible skin problems.

Moreover, for patients who can not change their posture by themselves such as, for example, patients who are handicapped cannot support their trunks by themselves, bedridden patients (particularly aged persons) or the like, various types of depressurization mats for preventing bedsores using air, water, gels, or the like, have been used. Although depressurization mats can distribute the body pressure, they have poor position-supporting properties and are unstable and, therefore, are not comfortable for patients. As a result, the need for skilled nursing to care for such patients has increased.

Furthermore, if the body pressure dispersibility of the depressurization mats is improved to provide more comfort to patients, its fixing stability will be reduced. On the other hand, if the fixing stability of the depressurization mats is improved, the body pressure dispersibility will be reduced. Thus the body pressure dispersibility and the fixing stability of depressurization mats cannot be maximized simultaneously.

Moreover, another conventional position-retaining device for retaining the sitting position of seriously handicapped persons is obtained from a mold. During preparation of the mold, the shape of the patient's affected body part is cast using a plaster to make a female mold (negative model). A male mold (positive model) is then prepared from the female mold. The fixing device is then obtained from the male mold using a two component type urethane resin material having cushioning properties. Alternatively, the position-retaining device is obtained using a material which is rigid and has high supporting properties, and a cushion material is then placed thereon.

Although the foregoing position-retaining devices are effective to retain the required posture of patients and handicapped persons, they are not permeable to air, and cannot be used for handicapped persons who lack sufficient physical strength and suffer from neuropathy. Furthermore, preparation of position-retaining devices which require a negative model and a positive model is time consuming and requires increased labor and cost.

Moreover, a material which is comprised of a number of chips bonded by urethane resin and which is formed for positioning a person's body or body part is known (See Japanese Unexamined Patent Publication No. 9-224796).

SUMMARY OF THE INVENTION

The present invention is directed to a position-retaining material and to a method of manufacturing a position-retaining device utilizing the position retaining material which overcome the foregoing drawbacks of the conventional art.

It is an object of the present invention is to provide a position-retaining material which can be made to conform to the configuration of a person's body or body part to provide a position-retaining device for retaining the person's body or body part in a required position or attitude.

Another object of the present invention to provide a position-retaining device which securely and comfortably retains a person's body or body part in a particular position or attitude for a required period of time with the pressure from the body or body part being distributed uniformly and effectively on the position-retaining device.

Another object of the present invention is to provide a simple, efficient and economical method of manufacturing a position-retaining device.

The foregoing and other objects of the present invention are carried out by a position-retaining material comprising a mixture containing a predetermined amount of elastic granules and a predetermined amount of water-curable resin having an elasticity after curing sufficient for bonding the elastic granules after curing of the water-curable resin. The mixture forms a mass before curing of the water-curable resin which permits the elastic granules to move one another to shape the mass into a configuration corresponding to the shape of the persons's body or body part when pressure is applied on the mass by the person's body or body part.

The mixture containing the elastic granules and the water-curable resin is preferably disposed in a bag comprised of a material which is inactive to the water-curable resin, which has a low moisture content, and which is permeable to water and air. Prior to use, the bag containing the mixture is preferably stored in a packaging bag comprised of a material which is impermeable to moisture.

In another aspect, the present invention provides a method of manufacturing a position-retaining device for retaining a person's body or body part in a particular position. A predetermined amount of elastic granules is mixed with a water-curable resin having an elasticity after curing sufficient for bonding the elastic granules after curing of the water-curable resin. A predetermined amount of the mixture is then placed in a mass which, before curing of the water-curable resin, permits the elastic granules to move one another when pressure is applied to the mass. Water is then added to the mass. Thereafter, pressure is applied to the mass by a person's body or body part to cause the elastic granules to move one another to thereby form a mold having a configuration corresponding to the shape of the person's body or body part. The water-curable resin is then allowed to gradually cure to bond the elastic granules to thereby form the position retaining device.

The elastic granules and the water-curable resin have an appropriate elasticity, even after curing of the water-curable resin, which securely retain a person's body or body part in a particular position for a required period of time, and which can effectively distribute the pressure applied by the person's body or body part to prevent the formation of bed-sores.

BRIEF DESCRIPTION OF THE DRAWINGS

The foregoing summary, as well as the following detailed description of preferred embodiments of the invention, will be better understood when read in conjunction with the accompanying drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE PREFERRED EMBODIMENTS

While this invention is susceptible of embodiments in many different forms, this specification and the accompanying drawings disclose only some examples of the use of the invention. The invention is not intended to be limited to the embodiments so described, and the scope of the invention will be pointed out in the appended claims.

Figure 1:
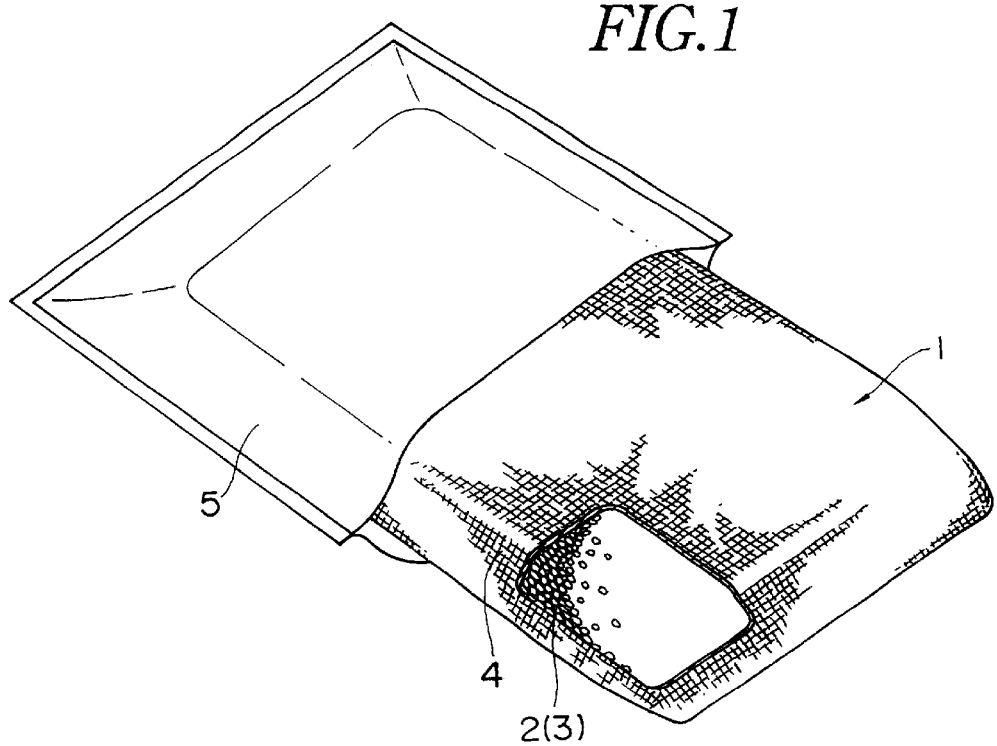
FIG. 1 is a partially cutaway perspective view showing an embodiment of a position-retaining material according to the present invention.
Figure 2:
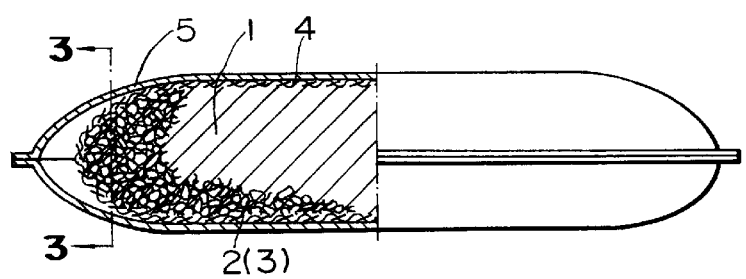
FIG. 2 is a partially cutaway front view of the position-retaining material shown in FIG. 1.
Figure 3:
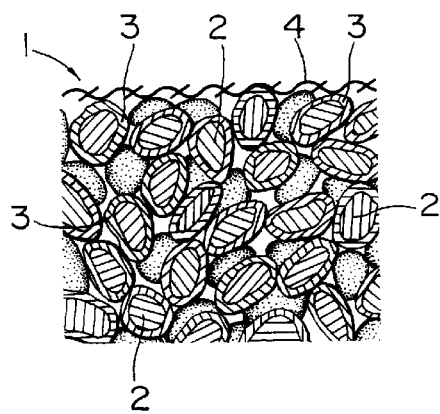
FIG. 3 is an enlarged partial cross-sectional view taken along line 3—3 in FIG. 2 with the laminate bag omitted.
Figure 4A:
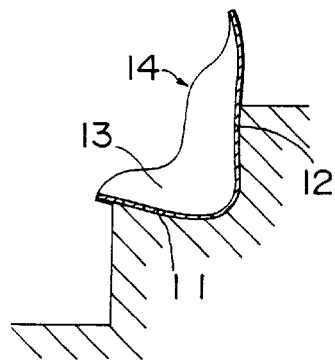
FIGS. 4(A)–4(F) are explanatory views showing how a position-retaining device according to the present invention is prepared using the position-retaining material shown in FIGS. 1–3.
Figure 4B:
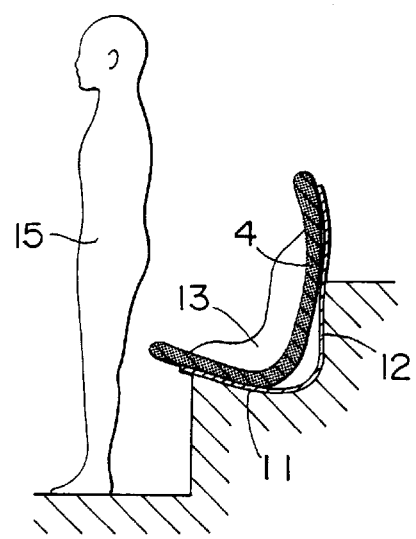
Figure 4C:
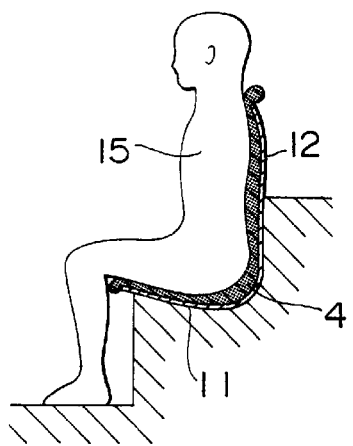
Figure 4D:
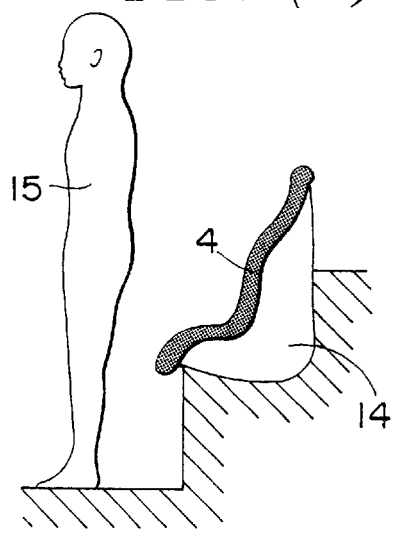
Figure 4E:
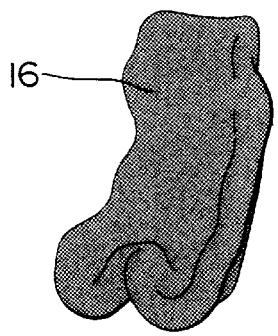
Figure 4F:
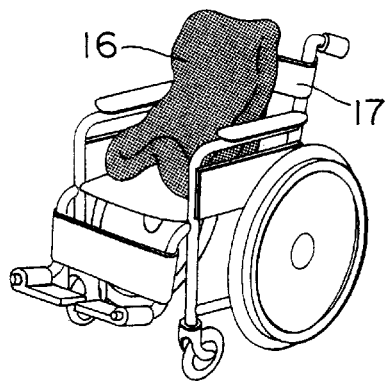
Figure 5:
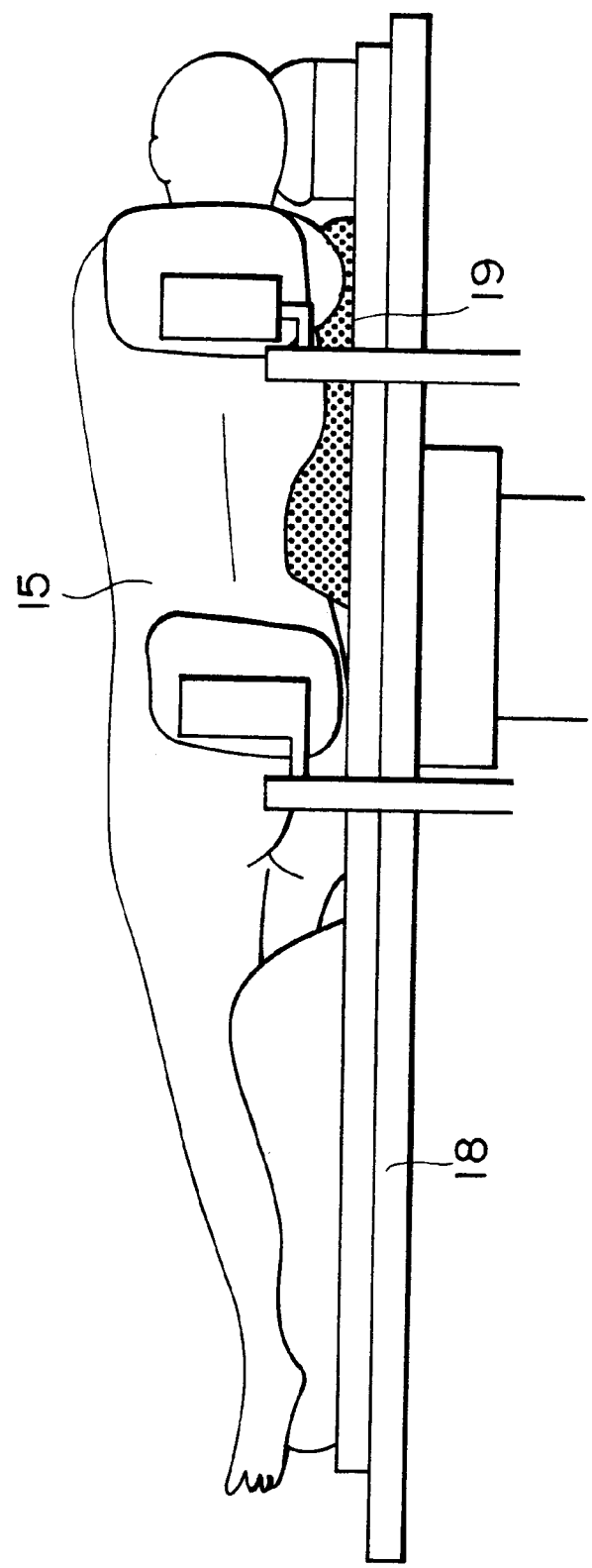
FIG. 5 is an explanatory view showing a position-retaining device according to the present invention retaining a patient on an operating table in a lateral position.
Figure 6:
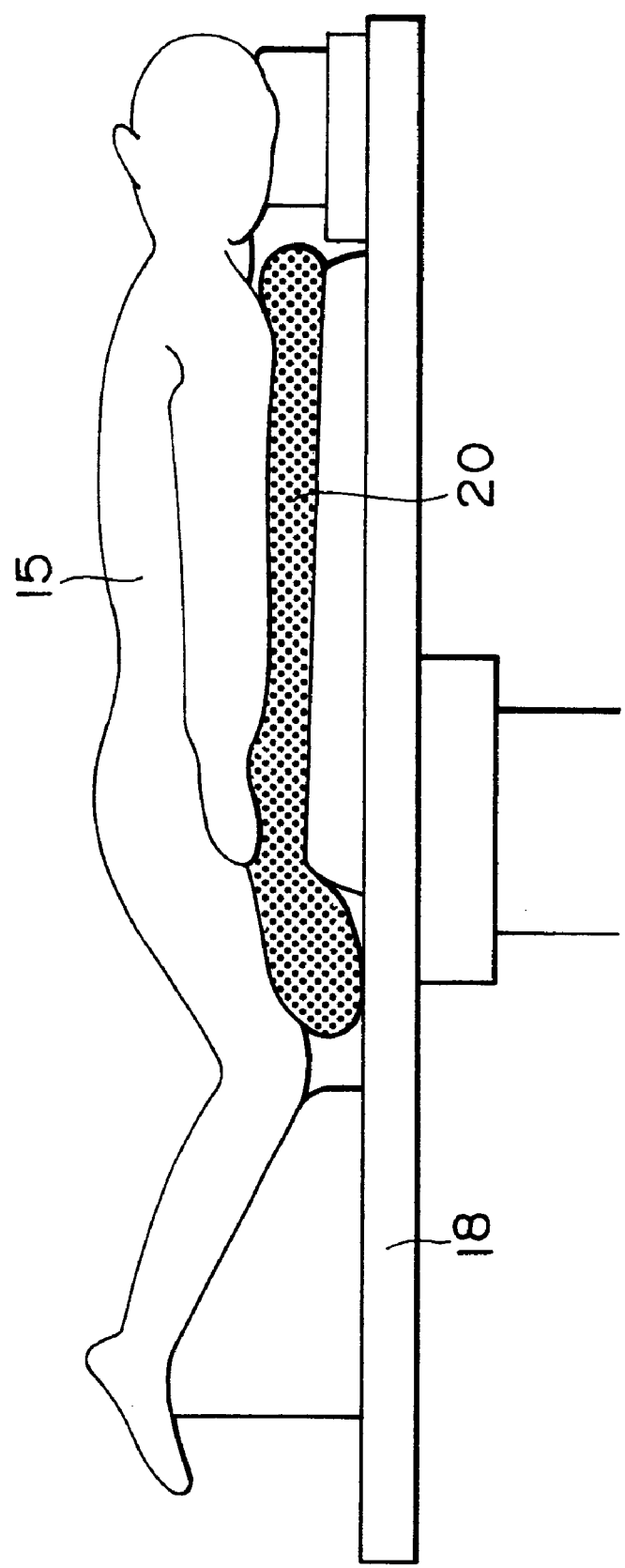
FIG. 6 is an explanatory view showing a position-retaining device according to the present invention retaining a patient on an operating table in an abdominal position.

FIGS. 1–3 show a preferred embodiment of a position-retaining material, generally designated at 1, according to the present invention. FIGS. 4A–4F show the preparation of a position-retaining device 16 according to the present invention utilizing the position-retaining material 1 shown in FIGS. 1–3. FIGS. 5 and 6 show particular applications of position-retaining devices 19, 20, respectively, according to the present invention for retaining the body or body part of a person 15 in a particular position. The position-retaining material 1 comprises a mixture containing a predetermined amount of elastic granules 2 and a water-curable resin 3 which has a preselected elasticity after curing sufficient for bonding the elastic granules after curing of the water-curable resin. The mixture forms a mass before curing of the water-curable resin 3 which permits the elastic granules 2 to move one another to shape the mass into a configuration corresponding to the shape of the persons's body or body part when pressure is applied on the mass by the person's body or body part.

The mixture containing the elastic granules 2 and the water-curable resin 3 is preferably disposed in a bag 4 comprised of a material which is inactive to the water-curable resin, which has a low moisture content, and which is permeable to water and air. Prior to using the position-retaining material 1 as further described below, the bag 4 containing the mixture is preferably stored in a packaging bag 5 comprised of a material which is impermeable to moisture.

The granules 2 are comprised of an elastic material which is inactive or is processed to be inactive to the water-curable resin 3 in an uncured state. The following materials may be used for the elastic granules 2: olefin type granules, such as polyethylene or polypropylene having an elasticity imparted by a softener or a plasticizer, or copolymers thereof; vinyl acetate copolymers; polyvinyl chloride; polystyrene; polyester; polyethylene; polyurethane; neoprene; polybutadiene; silicone; and other rubber materials which have an elasticity likewise imparted or which have inherent elastic properties. Furthermore, elastic bodies and gelled bodies which are inactive to the water-curable resin 3 may also be used.

The following commercially available granules, for example, may be used as the elastic granules 2 of the position-retaining device of the present invention: COSMO-GEL (trade name, manufactured by COSMO INSTRUMENTS CO., LTD.); MNCS (trade name, manufactured by BRIDGESTONE CORPORATION); ALPHAGEL (trade name, manufactured by SIGEL CO., LTD.); PEF (trade name, manufactured by TORAY INDUSTRIES, INC.); MITSUFUKU FORM (trade name, manufactured by MITSUFUKU INDUSTRY CO., LTD.); EXE SEAL (trade name, manufactured by INOAC CORPORATION); KALSOFT (trade name, manufactured by TAKIRON CO., LTD. ); Neoprene Rubber (manufactured by YAMAMOTO CHEMICAL IND. CO., LTD.); CR Latex (manufactured by DAIWABO CO.,LTD. and MARUSHIN CHEMICAL INDUSTRIES CO.. LTD.); SILICONE SPONGE (manufactured by CHIYODA RUBBER CO., LTD., INOAC CORPORATION and SHIN-ETSU CHEMICAL CO., LTD.).

Preferably, the granules 2 are generally spherical-, rod-, cubic-, rectangular parallelopiped-, columnar- or disk-shaped. More preferably, the granules 2 have a shape in which the corners are chipped off or rounded. Furthermore, the granules 2 may be formed into a solid or hollow body, or may be a foam. In the case that the granules 2 are comprised of a foam, it should preferably be a closed-cell foam so that the water-curable resin 3 will not permeate into the granules. For example, a closed-cell foam whose surface is covered with a thin layer of material is preferred.

The size of the granules 2 should preferably be at most about 8 $cm^3$, depending upon the region of the person's body to which the position-retaining device is applied, the material used for the granules 2, and the type of water-curable resin 3 used. More preferably, the size of the granules 2 is at most 0.125 $cm^3$, by which a position-retaining device having a smooth surface can be obtained. Use of granules having a size larger than about 8 $cm^3$ can ensure a high air permeability, but may sometimes result in an inferior surface smoothness and adversely affect the elastic properties of the granules.

The hardness of the material constituting the granules 2 is preferably at most about 2 $kg/cm^2$, and more preferably at most about 1.0 $kg/cm^2$, as measured in accordance with a hardness test of a soft urethane foam (JIS: Japan Industrial Standard, K6401 5.4). Furthermore, the compressive residual strain of the granules 2 in this state (JIS: Japan Industrial Standard, K6401 5.5) is preferably at most about 15%, and more preferably at most about 13%. If the compressive strength of the granules 2 is higher than about 2 $kg/cm^2$ and the compressive residual strain is higher than 15%, the granules tend to be excessively hard and generate strain during use of the position-retaining device, whereby the comfortability during use is decreased.

It will be appreciated by those of ordinary skill in the art that a combination of two or more different types of granules comprised of the materials and having the shapes, properties and sizes as set forth above may alternatively be used for the granules 2 of the position-retaining material 1 according to the present invention.

The water-curable resin 3 is preferably comprised of a material having an appropriate elasticity after curing. The type of water-curable resin 3 is selected so that the granules 2 bond with the water-curable resin when the water-curable resin is reacted and cured by the addition of water as further described below. Alternatively, the granules 2 may be wrapped with a material so that the granules are surrounded by the water-curable resin 3 without bonding with the water-curable resin.

The elasticity of the water-curable resin 3 after curing is measured by the following measurement method. A water-curable resin is coated on a release paper to a thickness of 100 $\mu m$ using a film coating machine, such as FILM-COATER P1-1210 (manufactured by TESTER ANGYO CO., LTD.), and left to stand at room temperature for 24 hours for curing. After curing, the sheet is cut into a piece with a size of 25×200 mm to prepare a test piece. The test piece is then subjected to testing using, for example, the Autograph 500D tester (manufactured by SHIMAZU CORPORATION) to measure its tensile strength when elongated by 25% and under the conditions that the speed of testing rate of stressing is 10 mm/min. and the length of the test piece is 100 mm. The measured value is then converted in terms of $cm^2$.

The tensile strength of the cured water-curable resin measured by the foregoing method is preferably at most about 15 $kg/cm^2$, and more preferably at most about 5 $kg/cm^2$ (at the time of 25% elongation). If the tensile strength is higher than about 15 $kg/cm^2$, the elasticity of the water-curable resin is low, and it becomes difficult for the resulting position-retaining device to distribute the pressure of the person's body or body part efficiently.

A water-curable urethane prepolymer is preferably used as the water-curable resin 3 because it can be easily and conveniently cured by the addition of water. However, other curable resins such as, for example, moisture-curable silicone resins or the like, may be used.

The water-curable urethane prepolymer is a prepolymer having isocyanate groups at terminal ends, obtainable by the reaction of a polyol and polyisocyanate. As the polyol, a low molecular weight polyol such as polyethylene glycol, polypropylene glycol and polyglycerol, a polyether polyol obtainable by adding alkylene oxide such as ethylene oxide or propylene oxide to a polyphenol, a polyester polyol obtainable by dehydration condensation of a low molecular weight polyol and a dicarboxylic acid such as adipic acid or phthalic acid, a polytetramethylene glycol obtainable by ring opening polymerization of a lactone, such as y-butyrolactone or $\epsilon$-caprolactone, a polydiene polyol which is a polymer of a diene compound such as butadiene or isoprene and has hydroxyl groups at terminal ends, and mixtures thereof, may be used. It is often preferred to use polyethylene glycol or polypropylene glycol as the polyol.

The average molecular weight of the polyol is preferably from about 600 to 4,000, and more preferably from about 1,000 to 2,000. If the molecular weight is too small, the elasticity of the water-curable resin tends to be poor, and if it is too large, it tends to be highly elastic. However, a high viscosity makes it difficult to mix with the granules. The viscosity is therefore preferably from about 10 to 2,000 ps, and more preferably from about 500 to 1,000 ps at 20° C.

As the polyisocyanate, known organic polyisocyanates may be used. For example, the following organic polyisocyanates may be used: diphenylmethane diisocyanate; toluene diisocyanate; 1,5-naphthalene diisocyanate; tolidine diisocyanate; hexamethylene diisocyanate; isophorone diisocyanate; p-phenylene diisocyanate; transcyclohexane 1,4-diisocyanate; xylene diisocyanate; hydrogenated xylene diisocyanate; hydrogenated diphenylmethane diisocyanate; lidine diisocyanate; triphenylmethane triisocyanate; tris (isocyanatephenyl) thiophosphate; tetramethylxylene diisocyanate; lidine ester triisocyanate; 1,6,11-undecane triisocyanate; 1,8-diisocyanate-4-isocyanate methyloctane; 1,3,6- hexanemethylene triisocyanate; bicycloheptane triisocyanate; trimethylhexame thylene diisocyanate; polymethylenepolyphenylene polyisocyanate and 3-isocyanatemethyl 3,5,5-trimethylcyclohexyl isocyanate; and carbodiimide-modified or isocyanurate-modified polyisocyanates thereof.

The foregoing polyisocyanates may be used alone or as a mixture of appropriate combinations thereof. Among the foregoing compounds, aromatic polyisocyanates such as diphenylmethane diisocyanate, p-phenylene diisocyanate and polymethylenepolyphenylene polyisocyanate, and carbodiimide-modified polyisocyanates thereof, may be used. Furthermore, the proportions of the polyol and the polyisocyanate used is preferably from about 1.2 to 10 equivalents of polyisocyanate, preferably from about 1.5 to 5 equivalents, based on 1 equivalent of polyol.

Certain additives may be added to the water-curable resin 3, including a catalyst, a stabilizer, a defoaming agent, an antioxidant, a colorant, a thixotropy imparting agent, a filler or the like, taking into consideration the curing time, the storage stability, the acceleration of degassing during curing, the color tone on finish, or the like. As such additives, known compounds may suitably be used depending upon the components of the water-curable resin 3.

In the case in which water-curable urethane prepolymer is used, the following catalysts, for example, may be used: bis(2,6-dimethylmorpholino)diethylether; triethylenediamine; cyclohexylamine; dimethylethanolamine; a substituted morpholine; dimethylpiperazine; dimethylaminoethyl-3-dimethylaminopropylether; dimorpholinoethane; tetraethylethyleneamine; imidazole; triethanolamine; 1,3-bis(dimethylamino)2-propanol; dimethylaminoethoxyethanol; dimorpholinodiethylether; dimethylaminodiethylether; bis(morpholinoethyl)ether; and 4-[2-[1-methyl-2-(4-morpholinyl)ethoxy]ethyl]monpholine. These catalysts may be used alone or as a mixture thereof, and may preferably be used in an amount of from about 0.01 to 5% (i.e., % by weight) to the water-curable urethane prepolymer.

As the stabilizer, organic acids, organic acid chlorides, acidic substances such as acidic phosphates, chelating agents (diketone compounds and hydroxycarboxylic acids) and the like may be used. The type of stabilizer selected should take into consideration the type of catalyst used. Methanesulfonic acid may suitably be used as the organic acid. The amount of the stabilizer added is preferably from about 0.01 to 3%.

As the defoaming agents, silicone-type and wax-type defoaming agents may be used. Preferably, silicone-type defoaming agents are used in an amount of from about 0.01 to 2%. As the antioxidant, hindered phenols and phosphorus type compounds are suitable. A preferred antioxidant is tetrakis [methylene-3-(3-5-di-tertiary-butyl-4-hydroxyphenyl) propionate] methane. As the colorant, it is preferable to use coloring matter approved by the Japanese Pharmaceutical Affairs Law, which have a reduced risk of causing skin problems.

Use of the thixotropy imparting agent prevents maldistribution of the water-curable resin 3 in the mixture, thereby permitting the water-curable resin and the granules 2 to be maintained in a uniformly mixed state. In the case where the water-curable urethane prepolymer is used as the thixotropy imparting agent, silica, titanium oxide, polyalkylene modified compounds obtainable by treating terminal hydroxyl groups of an organic type polyalkylene glycol with a hydroxyl group treating agent, i.e. usually, ones obtainable by treating polyethylene glycol, polypropylene glycol or a copolymen thereof with methyl chloride, fatty acid or the like, aromatic carboxylates, benzilidene sorbitol synthesized by an acetalization reaction of D-sorbitol and an aromatic aldehyde, ditrilidene sorbitols and the like, may be used. The added amounts of these additives is preferably from about 0.01 to 6%, and more preferably from about 0.05 to 3% based on the water-curable urethane prepolymer.

The physical properties of the water-curable resin 3 depend on the weight of the person's body or body part to be applied thereon. However, it is preferable to use a water-curable resin which has a curing time of from about 3 to 30 minutes after it is brought into contact with water, and which, after curing, will provide sufficient hardness to allow the weight of the person's body or body part to be applied thereon, will be subjected to a minimal change in volume as a result of the weight being applied, will not cause pyrexia, will not stimulate the person's body or body part, and will have high storage stability.

The amount of the water-curable resin 3 to be mixed with the granules 2 is preferably defined in terms of the amount of the water-curable resin per volume of the granules rather than in terms of weight ratio. Preferably, at least about 7.5 g of the water-curable resin 3 per liter of the granules 2 is used. More preferably, an amount of from about 45 to 420 g of the water-curable resin 3 per liter of the granules 2 is used.

The mixing of the granules 2 and the water-curable resin 3 may suitably be conducted at a temperature of 20° C. and a relative humidity of at least 20% using a mixing machine, such as a utility mixer, a concrete mixer or the like. For example, a mixing vessel is filled with a dried nitrogen gas, and a predetermined amount of granules 2 is poured thereinto. While stirring the granules 2 and the dried nitrogen gas, a predetermined amount of the water-curable resin 3 is added thereto, and the mixture is stirred until it becomes uniform. In this state, the granules 2 are sufficiently covered with the water-curable resin 3 to allow interconnection of the granules so that the granules are adhered and bonded in a mass with the water-curable resin while allowing the granules to move one another when pressure is applied to the position-retaining material 1 by the person's body or body part.

After the granules 2 and the water-curable resin are uniformly mixed, the resulting mixture, which forms a mass as described above, may be stored without being cured by disposing it directly into the packaging bag 5 (i.e., without the bag 4) which is preferably comprised of aluminum foils or the like. Alternatively, the mass is stored in a box or container which is not permeable to moisture.

During use of the position-retaining material 1, water is added to the mixture of granules 2 and water-curable resin 3 so that the mass is well infiltrated with water, and the excess water is drained off. A sheet of material having good releasability is then placed on an appropriate stand. For example, the sheet may be treated with silicone, fluoride or the like in order to provide sufficient releasability. Alternatively, a knit, a woven fabric, a nonwoven fabric or the like which has a density at a level such that the granules 2 will not pass through it, and which is formed by natural fibers, semi-synthetic fibers or synthetic fibers such as cotton, hemp, rayon, polyester, nylon, acryl, urethane or a styrene-isoprene-styrene copolymer, can be used instead of the releasable sheet of material. Preferably, the releasable sheet of material, the knit, the woven fabric and the non-woven fabric are sufficiently extensible so that they easily conform to the contour of the person's body or body part.

The mass is then covered with the releasable sheet of material, knit, woven fabric, or nonwoven fabric so that the water-curable resin does not adhere to the person's body or body part during use. The person's body or body part, such as the head and neck, shoulder, waist, lower extremity, upper half of the body, lower half of the body, or the whole body, is then placed on the mass which has been covered with the releasable sheet of material, knit, woven fabric, or nonwoven fabric. The weight of the person's body or body part applies pressure to the mass, causing the granules 2 to move one another to shape the mass into a mold having a configuration corresponding to the shape of the person's body or body part. The water-curable resin 3 is then allowed to cure to form a position-retaining device which has sufficient rigidity and which is specifically formed to fit the person's body or body part to retain the same in a required position. When the position-retaining device thus constructed is used to retain the person's body or body part in the required position, the abovementioned releasable sheet of material, knit, woven fabric, or nonwoven fabric is removed and the person's body or body part is placed directly on the shaped mass.

In another embodiment, the mixture containing the granules 2 and the water-curable resin 3 is preliminarily encapsulated in the bag 4, as shown in FIGS. 1–3, and does not require use of the releasable sheet, knit, woven fabric, or nonwoven fabric as set forth above in the foregoing embodiment. By this construction, a predetermined amount of the mixture can be formed into mass and encapsulated in the bag 4, and, during use of the position-retaining device, such as during surgery, the operating surgeon, patient or the like will not contact the water-curable resin 3 directly. Accordingly, possible adverse skin conditions resulting from direct contact with the watercurable resin 3 are effectively prevented, thereby facilitating use of the position-retaining device.

The bag 4 is preferably comprised of a knit, woven fabric, nonwoven fabric or the like which has low moisture content, which is permeable to water and air, and which is inactive to the water-curable resin 3. For example, the material for the bag 4 should not have a chemical structure nor contain a substance which activates the reactive groups of the water-curable resin 3. The particular size, shape and structure of the bag 4 can be selected depending upon the person's body or body part to which it is to be applied. In the case where the bag 4 must be large in size in order to accommodate half or the whole person's body, it may sometimes be convenient to partition the inside of the bag 4 into a plurality of chambers.

As the material for the bag 4, synthetic fibers of, for example, polyester polypropylene, polyethylene, polyacryl, polyurethane, a styrene-isoprene-styrene copolymer (SIS) and polyamide, regenerated fibers and natural fibers such as rayon, staple fibers, cotton and hemp, and inorganic fibers such as glass fibers, may be used. If a material which is reactive to the water-curable resin 3 or which a high moisture content is selected, it is preferred to make the material inactive with the water-curable resin by preliminarily treating the surface of the material, and to remove the moisture by drying.

When water-curable urethane prepolymer is selected as the material for the water-curable resin 3, polyester, polypropylene, polyethylene, polyurethane, SIS and the like, which are not reactive to the uncured urethane prepolymer, are preferably used for the material of the bag 4. More preferably, polyester, polypropylene, polyethylene, polyurethane, SIS and the like which have a heat sealing property, and mixed-spun fibers thereof, are used for the material of the bag 4.

The material selected for the bag 4 should have sufficient flexibility and elasticity to allow the bag 4 and the mixture contained therein to be shaped in conformity with the contour of the person's body or body part to which the position-retaining device is applied. Preferably, the material for the bag 4 should be able to undergo elongation of at least about 15% in any one of the vertical and horizontal directions. If the degree of elongation is less than 15%, it may sometimes be difficult to shape the bag 4 mixture contained therein in conformity with the contour of the person's body or body part.

The material for the bag 4 is also preferably selected so that it has a low affinity to the water-curable resin 3. The degree of adhesion between the bag 4 and the mixture of the granules 2 and the water-curable resin 3 is preferably at most about 0.5 kg/25 mm (in accordance with JIS Z0237,8). If the degree of adhesion is higher than 0.5 kg/25 mm, the water-curable resin 3 may penetrate the fibers of and adhere to the bag 4 when the bag is stored for a long period of time. It is therefore preferred to maintain the degree of adhesion between the bag 4 and the mixture of the granules 2 and the water-curable resin 3 to at most about 0.3 kg/25 mm, and more preferably at most about 0.1 kg/25 mm.

The knit, woven fabric and the like used for the bag 4 may be formed by bundling a lot of thin fibers. In such a case, it is preferred to conduct a treatment to lower the affinity of the bag 4 to the water-curable resin 3 in order to prevent the water-curable resin from penetrating into the thin fibers. For example, the knit, woven fabric and the like may be treated with, for example, a fluorine-type, a silicone-type, a paraffin-type, an alkylchlomic chloride-type, an alkylethylene urea-type and an alkylmethylpyridium chloride-type treating agent. In one example, the treating agent is used in an amount such that the active ingredient would be attached onto the surface of the bag 4 in an amount of from about 0.1 to 6%. In another example, when treating agent of a fluorine-type emulsion is used in an amount such that the active ingredient would be attached onto the surface of the bag 4 in an amount of 7%, the stability of the bag during storage is further improved. The treating agent may be attached by impregnating, coating, spraying or the like, before or after the preparation of the knit, woven fabric and the like.

Prior to being used to form the position-retaining device, the bag 4 containing the mixture of the granules 2 and the water-curable resin 3 is preferably stored in the packaging bag 5, as shown in FIG. 1. The packaging bag 5 is preferably comprised of a material which is impermeable to moisture, such as aluminum foils.

In a preferred embodiment, the bag 4 is prepared by knitting yarns of about 200 denier made of polypropylene or polyester alone or a blend thereof in a cylindrical shape with a density of 22 lines/inch in a course direction and 22 lines/inch in a wales direction, a unit weight of about 230 g/m$^2$, and a stretchability of from 5 to 60% in a vertical direction and from 50 to 300% in a horizontal direction. For example, "WHITE NET" (tradename, manufactured by ALCARE CO.) is suitable for the bag 4 according to the present invention.

During use, the packaging bag 5 is opened and the bag 4 containing the mixture of the granules 2 and the water-curable resin 3 is removed. The bag 4 is then dipped in water so that the water penetrates into the bag and reaches the mixture. The bag 4 is then removed from the water and is lightly squeezed to remove excess water. Thereafter, the bag 4 is disposed on a surface of a chair, medical table and the like, and the person's body or body part, such as the head and neck, shoulder, waist, lower extremity, upper half of the body, lower half of the body, or the whole body, is placed on the bag. The weight of the person's body or body part applies pressure to the bag 4, causing the granules 2 to move one another to shape the bag into a mold having a configuration corresponding to the contour of the person's body or body part. In this state, the water-curable resin 3 is allowed to cure to provide a body which is specifically shaped to fit the person's body or body part. The shaped body can then be used as the position-retaining device to retain the person's body or body part in a required position.

The shaped body thus formed has adequate hardness and elasticity adjusted to be at most about 1.5 kg/cm$^2$ in term of a 25% compressive hardness. Furthermore, the compressive residual strain is adjusted to be at most about 13%. More preferably, the 25% compressive hardness is adjusted to be at most about 0.5 kg/cm$^2$ and the compressive residual strain is adjusted to be at most about 10%.

The 25% compressive hardness and the compressive residual strain are measured by the following methods.

25% Compressive Hardness:

A uniform mixture containing the granules 2 and the water-curable resin 3 is poured into a mold of 5 cm×5 cm×5 cm, and 10 ml of distilled water is added and spread over the entire surface of the water-curable resin 3. The water-curable resin 3 is then allowed to cure to form the a resin block. After curing, the resin block is taken out of the mold to use it as a test piece.

Using the Autograph 500D tester (manufactured by SHIMAZU CORPORATION) in accordance with JIS K6401 5.4, the resin block is then subjected to 75% compression at a rate of 10 mm/min., and the load is immediately removed. The resin block is then subjected to 25% compression at a rate of 10 mm/min., and the load at this time is read and converted in terms of cm$^2$.

Compressive Residual Strain

A test piece is prepared in the same manner set forth above for the 25% compressive hardness test. The thickness of this test piece is then measured accurately. Thereafter, in accordance with JIS K6401 5.5, the test piece is fixed with aluminum compression plates having inner surfaces parallel to each other and subjected to 50% compression, and is maintained in a constant temperature bath of 20° C. for 4 hours. The test piece is then taken out of the bath, and the load is removed. Thirty minutes later, the thickness of the test piece is measured. The ratio of the reduction in the thickness as compared with the original thickness is referred to as the compressive residual strain.

When urethane prepolymer is used for the water-curable resin 3, a resin network is formed when the water-curable resin reacts with the water and carbon dioxide gas is generated. Since the carbon dioxide gas runs out of the water-curable resin 3, ventilating paths are formed in a net-like fashion in the water-curable resin due to the formation of carbon dioxide bubbles. As a result, the resulting position-retaining device is highly permeable to air.

During use of the position-retaining device according to the present invention, the person's body or body part is securely supported in a required position. The position-retaining device has sufficient elastic and cushioning properties so that the body or body part is supported comfortably and the pressure applied by the body or body part is distributed uniformly and effectively. Accordingly, even during long operations or postoperative rest in bed, the position of the patient can be securely retained without being accompanied by pain. Furthermore, if the position-retaining device is used by patients who can not change their position by themselves, such as bedridden patients, the patients can be kept in bed without suffering from bedsores.

The following examples have been conducted to show the advantageous features of the position-retaining device according to the present invention.

EXAMPLE 1

A water-curable urethane prepolymer was prepared by mixing the following blend materials:

| | |
|---|---|
| PPG 2000 | 780 g |
| MDI | 200 g |
| NIAX CATALYST A-1 | 15 g |
| IRGANOX 1010 | 1 g |
| byk-A525 | 1 g |
| Benzoyl chloride | 5 g |

PPG 2000: polypropylene glycol having an average molecular weight of 2,000

MDI: 4,4'-diphenylmethane diisocyanate

NIAX CATALYST A-1: a mixture of bis(2-dimethylaminoethyl)ether and dipropylene glycol (manufactured by WITCO CO.. LTD.)

IRGANOX 1010: a hindered phenol type age register byk-A525: a silicone type defoaming agent The tensile strength (at the time of 25% elongation) of the water-curable urethane prepolymer after the curing was 2 kg/cm$^2$ (measured in accordance with the above-mentioned method).

As the granules, granules of "COSMOGEL 04" of polyethylene with a columnar shape having a volume of 0.05 cm$^3$ per granule (manufactured by COSMO INSTRUMENTS CO., LTD.) were prepared. The material of the granules had a 25% compressive hardness of 0.18 kg/cm$^2$ and a compressive residual strain of 2.5%.

To the granules, 170 g of the water-curable polyurethane prepolymer was added per liter of the granules, and these were thoroughly mixed so that the resin would cover the entire surface of the granules. After the mixture was allowed to cure, the resulting matrix had a 25% compressive hardness of 0.15 kg/cm$^2$ and a compressive residual strain of 3.5%, had sufficient elasticity and stiffness, and was highly permeable to air.

EXAMPLES 2–4 AND COMPARATIVE EXAMPLES 1–2

The following water-curable resins and granules were prepared to produce position-retaining devices of EXAMPLES 2–4 and COMPARATIVE EXAMPLES 1–2.

RESIN A: The water-curable urethane prepolymer of EXAMPLE 1.

RESIN B: Water-curable urethane prepolymer

| | |
|---|---|
| PPG 2000 | 660 g |
| MDI | 320 g |
| NIAX CATALYST A-1 | 15 g |
| IRGANOX 1010 | 1 g |
| byk-A525 | 1 g |
| Benzoyl chloride | 5 g |
| GELOL D | 0.065 g |

Note:

GELOL D: a thixotropy imparting agent (benzilidene sorbitol as an acetalization product of D-sorbitol and an aromatic aldehyde; manufactured by NEW JAPAN CHEMICAL CO., LTD.)

RESIN C: Water-curable urethane prepolymer

| | |
|---|---|
| PPG 2000 | 320 g |
| PPG 400 | 230 g |
| MDI | 420 g |
| NIAX CATALYST A-1 | 15 g |
| IRGANOX 1010 | 1 g |
| byk-A525 | 1 g |
| Benzoyl chloride | 5 g |

Note:

PPG 400: polypropylene glycol having an average molecular weight of 400

GRANULES E:

Granules of "COSMOGEL 04" made of polyethylene with a columnar shape having a volume of 0.05 cm$^3$ per granule (manufactured by COSMO INSTRUMENTS CO., LTD.) used in EXAMPLE 1.

GRANULES F:

Closed-cell foam chloroprene rubber sponge "C-4305" having a cubic shape with each edge being 3 mm (manufactured by INOAC CORPORATION).

GRANULES G:

Closed-cell polyethylene foam "MITSUFUKU FORM PF-07" having a cubic shape with each edge being 3 mm (manufactured by MITSUFUKU INDUSTRY CO., LTD.).

GRANULES H:

50-times foamable closed-cell polystyrene foam "Eslen Beads HCM" having a spherical shape with a diameter of 4 mm (apparent specific gravity: 0.02 ; manufactured by SEKISUI PLASTICS CO., LTD.).

Using RESINS A to C and GRANULES E to H, position-retaining devices of EXAMPLES 2 TO 4 and COMPARATIVE EXAMPLES 1 TO 2 were prepared with the same mixing proportion as EXAMPLE 1. The characteristic values of the resins and the granules and the characteristic values of the resulting position-retaining devices are indicated in the following table. The respective characteristic values C-1 to C-5 shown in the table are defined as follows:

Characteristic value 1 (C-1): tensile strength of the water-curable resin after curing (at the time of 25% elongation; measured in accordance with the above-mentioned method).

Characteristic value 2 (C-2): 25% compressive hardness of the granules (in accordance with JIS K6401 5.4 ).

Characteristic value 3 (C-3): compressive residual strain of the granules (in accordance with JIS K6401 5.5).

Characteristic value 4 (C-4 ): 25% compressive hardness of the position-retaining device (measured in accordance with the above-mentioned method).

Characteristic value 5 (C-5): compressive residual strain of the position-retaining device (measured in accordance with the above-mentioned method).

| | Ex. 2 | Ex. 3 | Ex. 4 | Comp. Ex. 1 | Comp. Ex. 2 |
|---|---|---|---|---|---|
| Resin | A | B | A | C | A |
| C-1 (kg/cm$^2$) | 2 | 13 | 2 | * | 2 |
| Granules | E | E | F | G | H |
| C-2 (kg/cm$^2$) | 0.18 | 0.18 | 0.8 | 3.0 | 1.6 |

-continued

| | Ex. 2 | Ex. 3 | Ex. 4 | Comp. Ex. 1 | Comp. Ex. 2 |
|---|---|---|---|---|---|
| C-3 (%) Retainer | 2.5 | 2.5 | 2.6 | 2.0 | 21.0 |
| C-4 (kg/cm$^2$) | 0.14 | 0.45 | 0.65 | 2.9 | 1.25 |
| C-5 (%) | 2.5 | 3.8 | 4.2 | 12.0 | 18.0 |

Note: *indicates that the resin was broken before it was stretched by 25%, and the measurement was impossible. C-1 to C-5 refer to Characteristic values 1 to 5, respectively.

The position-retaining devices obtained in EXAMPLES 1 to 4 had adequate 25% compressive hardness, compressive residual strain, stiffness and elasticity and were applicable for use. In contrast, in COMPARATIVE EXAMPLE 1, the 25% compressive hardness was high, which resulted in an uncomfortable position-retaining device, and in COMPARATIVE EXAMPLE 2 , the compressive residual strain was large. As a result, the position-retaining devices obtained in COMPARATIVE EXAMPLES 1 and 2 were not applicable for use.

EXAMPLE 5

EXAMPLE 5 will described with reference to FIGS. 1–3 and 4(A)–4(F). The granules 2 and the water-curable polyurethane prepolymer 3 indicated in EXAMPLE 1 were mixed in the abovementioned proportion. The resulting mixture was encapsulated in the bag 4 having dimensions of 50 cm (horizontal)×60 cm (vertical) and comprised of a knit made of polypropylene fibers having a stretchability of 15% in a horizontal direction. The bag 4 was stored in the packaging bag 5, preferably comprised of aluminum laminate, and the packaging bag was hermetically sealed.

Before use, the bag 4 together with the mixture contained therein was crumpled, while stored in the aluminum laminate bag 5, to uniformly mix the granules 2 and the water-curable polyurethane prepolymer 3. The aluminum laminate bag 5 was then opened and the bag 4 was taken out. Thereafter, the bag 4 was dipped in water and taken out, and the bag 4 was lightly squeezed to remove excessive water.

A chair 14 having a seating portion 11, a chair back portion 12 and an arm rest portion 13 integrally formed with a plastic material was prepared (FIG. 4 (A)). The position-retaining material 1 was placed on an inner surface of the chair 14 so as to cover the inner surface (FIG. 4 (B)). A patient 15 was instructed to sit on the position-retaining material 1, and the position-retaining material was manipulated by hand so that it would fit on and form a mold of the parts of the body of the patient to which it is applied (FIG. 4 (C)). The water-curable polyurethane prepolymer 3 of the position-retaining material was then allowed to gradually cure so that it would interconnect the granules 2. After a period of about 5 minutes had elapsed, in a state in which no more deformation is caused, the patient rose from the chair (FIG. 4 (D)). When the position-retaining material 1 was removed from the chair 14 and the water-curable polyurethane prepolymer 3 was further cured, ventilating paths were formed by the generated carbon dioxide gas, thereby forming a position-retaining device 16 (FIG. 4 (E)). The position-retaining device 16 thus formed had adequate hardness and elasticity, and was highly permeable to air. When the position-retaining device 16 was installed on a wheelchair 17, the sitting positions of seriously physically handicapped individuals could be securely retained free of unpleasant discomfort while allowing the handicapped individuals to move easily (FIG. 4 (F)).

Furthermore, since the time for preparing the mold is short, as described above, the time during which the handicapped individuals are not allowed to move is very short. As a result, the handicapped individuals are subjected to less pain or unpleasant discomfort. Moreover, the position-retaining device 16 can be easily prepared without requiring special tooling or other devices.

EXAMPLE 6

As shown in FIG. 5, a position-retaining device 19 was prepared in accordance with EXAMPLE 5 for supporting upwardly a patient 15 laying in a lateral position on an operation table 18. The position-retaining device 19 can be effectively secure the patient 15 in the position shown in FIG. 5 during long operations or postoperative rest periods.

EXAMPLE 7

As shown in FIG. 6, a position-retaining device 20 was prepared in accordance with EXAMPLE 5 for supporting a wide range of the body of a patient 15 from the breast to the lower extremity while the patient is laying in an abdominal position on an operating table 18 The position-retaining device 20 is able to securely support the patient 15 in a stable position during long operations or postoperative rest periods.

According to the present invention, a position-retaining device which conforms to the contour of a person's body or body part to which it is applied and which can securely retain the same in a required position can be prepared easily in a short period of time without requiring the use of special devices or skill. The position-retaining device has adequate hardness and elasticity, is highly permeable to air, and distributes the pressure from the person's body or body part uniformly and effectively. Thus, even if used for a long period of time, the user will not feel any discomfort nor suffer from bedsores. Furthermore, if the position-retaining device is used by patients who can not change their position by themselves, such as bedridden patients, the patients can be kept in bed without suffering from bedsores.

Moreover, the position-retaining device will not become deformed even when transferred from one position to another. The position-retaining device is widely applicable to various other articles for retaining individuals in a constant position for a required period of time, such as, for example, automobile seats for racing drivers and the like.

From the foregoing description, it can be seen that the present invention comprises an improved position-retaining material and a method of manufacturing a position-retaining device utilizing the position-retaining material. It will be appreciated by those skilled the art that obvious changes could be made to the embodiments described in the foregoing description without departing from the broad inventive concept thereof. It is understood, therefore, that this invention is not limited to the particular embodiments disclosed, but is intended to cover all modifications thereof which are within the scope and spirit of the invention as defined by the appended claims.

We claim:

1. A position-retaining material comprising: a body comprised of a predetermined amount of elastic granules and a predetermined amount of water-curable resin having an elasticity after curing sufficient for bonding the elastic granules after curing of the water-curable resin, the body forming a mass before curing of the water-curable resin so that when pressure is applied to the mass by a part having a preselected shape, the elastic granules move one another to shape the mass into a configuration corresponding to the preselected shape of the part, the shaped mass having a 25% compressive hardness of at most 1.5 kg/cm$^2$ and a compressive residual strain of at most 13% after the water-curable resin has been cured.

2. A position-retaining material as claimed in claim 1; wherein the body further comprises a bag containing the elastic granules and the water-curable resin.

3. A position-retaining material as claimed in claim 2 ; wherein the bag is comprised of a material which is inactive to the water-curable resin, has a low moisture content, and is permeable to water and air.

4. A position-retaining material as claimed in claim 1; wherein the water-curable resin comprises water-curable urethane prepolymer.

5. A position-retaining material as claimed in claim 4; wherein the granules and the water-curable urethane prepolymer are inactive to each other before curing of the water-curable resin.

6. A position-retaining material as claimed in claim 4; wherein the body is encapsulated in an inactive water-permeable material.

7. A position-retaining material as claimed in claim 4; wherein the water-curable urethane prepolymer comprises polyisosyanate groups and polyol groups having about 600 to 4 ,000 average molecular weight.

8. A position-retaining material as claimed in claim 4; wherein the water-curable urethane prepolymer has a viscosity of 10 to 2,000 ps at 20° C.

9. A position-retaining material as claimed in claim 1; wherein the elastic granules and the water-curable resin are inactive to each other before curing of the water-curable resin.

10. A position-retaining material as claimed in claim 9; wherein the body is encapsulated in an inactive water-permeable material.

11. A position-retaining material as claimed in claim 1; wherein the body is encapsulated in an inactive water-permeable material.

12. A position-retaining material as claimed in claim 1; wherein the water-curable resin comprises water-curable urethane prepolymer.

13. A position-retaining material as claimed in claim 1; wherein the elastic granules and the water-curable urethane prepolymer are inactive to each other before curing of the water-curable resin.

14. A position-retaining material as claimed in claim 1; wherein the body is encapsulated in an inactive water-permeable material.

15. A position-retaining material as claimed in claim 1; wherein the elastic granules comprise soft urethane foam having a hardness of at most 2 Kg/cm$^2$.

16. A position-retaining material as claimed in claim 1; wherein the elastic granules have a compressive residual strain of at most about 15% as measured in JIS K6401 5.5 test.

17. A position-retaining material as claimed in claim 1; wherein the elastic granules have a size of at most about 8 cm$^3$.

18. A method of manufacturing a position-retaining device, comprising the steps of: mixing a predetermined amount of elastic granules with a predetermined amount of a water-curable resin having an elasticity after curing sufficient for bonding the elastic granules after curing of the water-curable resin; placing the mixture in a mass; adding water to the mass; applying pressure to the mass using a part having a preselected shape so that the elastic granules move one another to shape the mass into a configuration corresponding to the preselected shape of the part; and allowing the water-curable resin to cure to bond the elastic granules to thereby form the shaped mass with a 25% compressive hardness of at most 1.5 kg/cm$^2$ and a compressive residual strain of at most 13%.

19. A method as claimed in claim 18; wherein the part in the applying step comprises a human body or a part of the human body.

20. A method as claimed in claim 18; wherein the water-curable resin comprises water-curable urethane prepolymer.

21. A method as claimed in claim 20; wherein the elastic granules and the water-curable urethane prepolymer are inactive to each other before the curing step.

22. A method as claimed in claim 20; including the step of encapsulating the mass in an inactive water-permeable material before the curing step.

23. A method as claimed in claim 18; wherein the granules and the water-curable resin are inactive to each other before the curing step.

24. A method as claimed in claim 23; including the step of encapsulating the mass in an inactive water-permeable material before the curing step.

25. A method as claimed in claim 18; including the step of encapsulating the mass in an inactive water-permeable material before the curing step.

26. A method as claimed in claim 18; wherein the water-curable resin comprises water-curable urethane prepolymer.

27. A method as claimed in claim 18; wherein the elastic granules and the water-curable urethane prepolymer are inactive to each other before the curing step.

28. A method as claimed in claim 18; including the step of encapsulating the mass in an inactive water-permeable material before the curing step.

29. A position-retaining device comprising: a body comprised of a mixture of elastic granules and a water-curable resin for bonding the elastic granules in a cured state of the water-curable resin, the body having a 25% compressive hardness of at most 1.5 kg/cm$^2$ and a compressive residual strain of at most 13% in the cured state of the water-curable resin.

30. A position-retaining device as claimed in claim 29; wherein the water-curable resin comprises water-curable urethane prepolymer.

31. A position-retaining device as claimed in claim 30; wherein the water-curable urethane prepolymer comprises polyisosyanate groups and polyol groups having about 600 to 4,000 average molecular weight.

32. A position-retaining device as claimed in claim 30; wherein the water-curable urethane prepolymer has a viscosity of 10 to 2,000 ps at 20° C.

33. A position-retaining device as claimed in claim 29; further comprising an inactive water-impermeable material for encapsulating the body.

\* \* \* \* \*